May 31, 1927.
W. K. RILEY
1,630,581
LUBRICATING DEVICE FOR VEHICLE SPRINGS
Filed Dec. 8, 1923
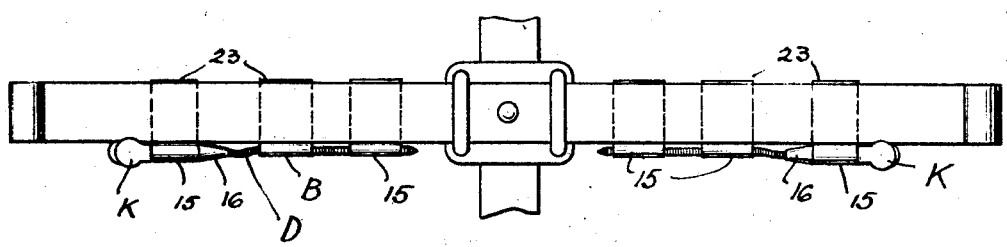
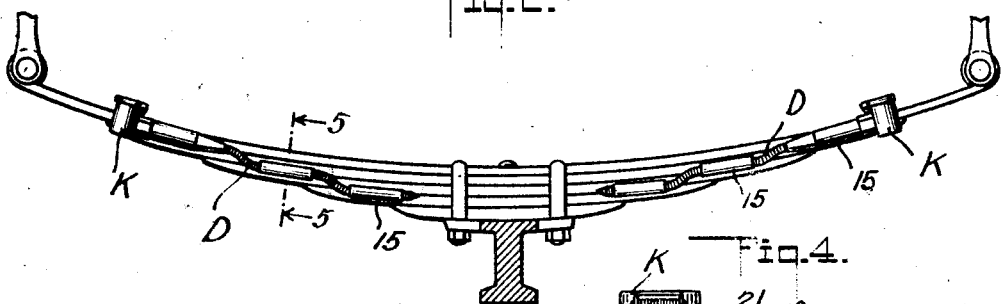
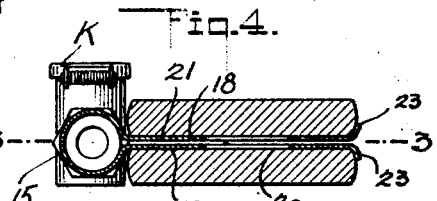
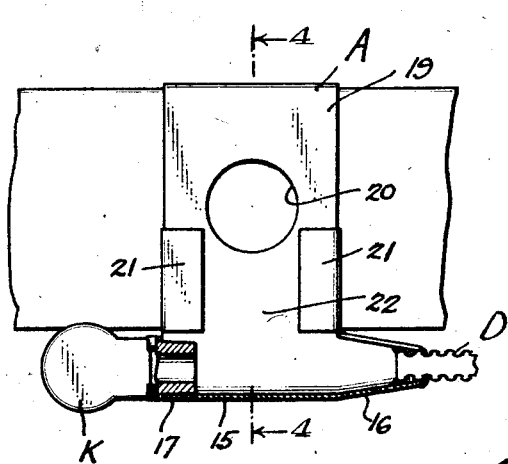
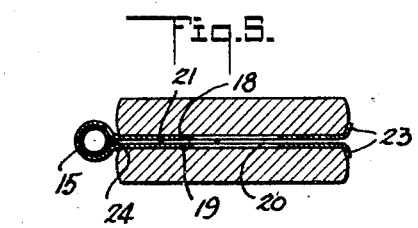
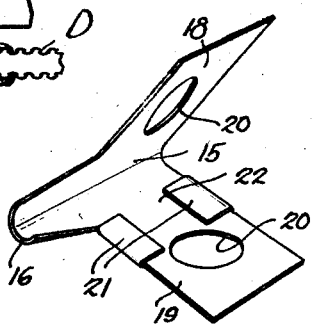
INVENTOR
WILLIAM K. RILEY
BY Munn & Co.
ATTORNEYS Patented May 31, 1927.

1,630,581

UNITED STATES PATENT OFFICE.

WILLIAM K. RILEY, OF HUNTINGTON PARK, CALIFORNIA.

LUBRICATING DEVICE FOR VEHICLE SPRINGS.

Application filed December 8, 1923. Serial No. 679,404.

My invention relates to lubricating devices for vehicle springs, and a purpose of my invention is the provision of a spring lubricating device which is simple and inexpensive in construction, capable of ready application to a spring, and highly efficient to automatically lubricate the several leaves of a spring.

It is also a purpose of my invention to provide a spring lubricating device which includes a reservoir and oil distributing units insertable between the leaves of a spring, and a conduit for conducting oil from the reservoir to the several distributing units, such conduit being flexible to permit positioning of the units at different levels for insertion between the leaves of a spring.

A further object of my invention is the provision of a spring lubricating device in which the oil distributing units, when inserted between the leaves of a spring, also operate to slightly space the leaves so as to reduce frictional contact between any two adjacent leaves and to thereby increase the resiliency of a spring.

I will describe only two forms of spring lubricating device each embodying my invention and will then point out the novel features thereof in claims.

In the accompanying drawings,

Figure 1 is a view showing in top plan a conventional form of vehicle spring having applied thereto one form of lubricating device embodying my invention;

Figure 2 is a view showing the spring in side elevation and with the lubricating device applied thereto;

Figure 3 is a horizontal sectional view taken on the line 3—3 of Figure 4;

Figure 4 is a vertical sectional view taken on the line 4—4 of Figure 3;

Figure 5 is a vertical sectional view taken on the line 5—5 of Figure 2;

Figure 6 is a detail view showing in perspective the main distributing unit shown in Figure 3;

Figure 7 is a fragmentary view of a vehicle spring having applied thereto another form of lubricating device embodying my invention.

Similar reference characters refer to similar parts in each of the several views.

Referring specifically to the drawings, my invention, in its present embodiment, comprises a main distributing unit designated generally at A, and a plurality of subsidiary distributing units designated generally at B. The main unit A and the subsidiary unit B are adapted for insertion between the leaves of the spring, and all of these units are adapted to be supplied with oil from a reservoir such as the oil cup K and through the medium of a conduit D which is flexible to permit of the positioning of the distributing units at different levels, as clearly shown in Figure 2.

The main distributing unit A, as shown in Figures 3 and 6, comprises a single length of metal bent between its ends to form a sleeve 15 having a tapered nozzle 16. The oil cup or reservoir K communicates with one end of the sleeve and is permanently connected thereto by means of the union 17. The tapered nozzle 16 is welded or otherwise secured to one end of the conduit D so that the sleeve 15 operates to provide communication between the oil cup and the conduit. Extending laterally from the sleeve 15, as shown in Figure 4, are companion lips or arms 18 and 19 formed with openings 20 and with the lower lip 19 provided with inturned flanges 21 which are introduced between the lips for maintaining the two in slightly spaced relation and to provide a relatively flat duct 22 through which oil can find its way to the opening 20. The free ends of the lips or arms 18 and 19 are reversely bent to form attaching flanges 23 which, as clearly shown in Figure 3, engage the edges of adjacent leaves to retain the distributing unit as a whole between the leaves.

Each subsidiary distributing unit B is constructed in the same manner as the main distributing unit A to the extent that it is provided with a sleeve 15 from which extends companion lips or arms 18 and 19 provided with openings 20 and with the lower lip 19 formed with spacing flanges 21 to provide a duct 22 through which oil from the chamber provided by the sleeve 15 can find its way to the openings 20. Each subsidiary unit is retained between the leaves of a spring by the permanent retaining flanges 23 (Figure 5.)

In the applied position of the lubricating device as shown in Figures 1 and 2, the main distributing unit is adapted to be interposed between the main leaf of the spring and the next leaf below, it being understood that it is necessary to first slightly separate the leaves to permit the insertion of the distributing unit, and when the unit is inserted it is retained therein by forming the retaining flange 23. The subsidiary distributing units B are applied in a similar manner between the other leaves of the spring the flexibility of the conduit D allowing the proper positioning of the units at different levels. In Figures 1 and 2 I have shown two lubricating devices applied to the opposite ends of the leaves of a spring.

In practice, the cup K is filled with oil and the latter being above the level of the distributing units, oil will gravitate from the cup into the sleeve of the main distributing unit, through the duct 22 thereof, and outwardly from the unit through the opening 20 into contact with the surfaces of the adjacent leaves of the spring. The major portion of the oil, however, passes from the sleeve 15 through the nozzle 16 and into the conduit D, whence it is successively supplied to the several subsidiary distributing units through ports 24 (Figure 5) and into ducts 22, the oil finally reaching the surfaces of the spring leaves through the openings 20. In this manner the thorough and effective lubrication of the spring leaves at the desired points will be automatically effected, and as the device is permanently associated with the spring it will be clear that the device can be re-supplied with oil from time to time by merely filling the oil cup K.

The interposing of the distributing units between the leaves of the spring tends to reduce the friction between the several leaves, thus rendering the spring more resilient.

Referring now to Figure 7, I have shown a lubricating device which consists of a single oil distributing unit designated at 25, which is adapted for insertion between the leaves of a spring. This distributing unit is constructed in a manner similar to the other distributing units herein described in that it is formed with companion lips 18 and 19. However, the tubular portion 15 is closed at its opposite ends and provided on its upper side with a lid-controlled nozzle 26 through which oil may be supplied to the tubular member 15 for subsequent distribution between the lips 18 and 19.

In practice, the tubular member 15 is completely filled with oil, thus providing a reservoir from which oil is distributed between the leaves of a spring by means of the lips 18 and 19.

Although I have herein described and shown only two forms of lubricating devices each embodying my invention, it is to be understood that various changes and modifications may be made herein without departing from the spirit of the invention and the spirit and scope of the appended claims.

I claim as my invention:

1. A spring lubricating device comprising an oil reservoir, oil distributing units adapted for insertion between the leaves of a spring, and a flexible conduit for conducting oil from the reservoir to the several distributing units.

2. A spring lubricating device comprising a plurality of oil distributing units adapted for insertion between the different leaves of a spring, and flexible means common to all of the units for supplying oil thereto.

3. An oil distributing unit comprising a single length of material bent to provide a sleeve and companion lips extending from the sleeve, said lips being formed with registering openings.

4. A lubricating device for springs comprising a main distributing unit, a reservoir communicating with one end of the unit, a flexible conduit in communication with the other end of the unit and formed at intervals along its length with discharge ports, and other distributing units embracing the conduit at intervals corresponding to the ports, the main distributing unit and each of the other units being formed from a single length of material bent to provide a sleeve, and companion lips providing a duct which communicates with the conduit.

5. An oil distributing unit comprising a sleeve companion lips extending from the sleeve and formed with registering openings, and means for maintaining the lips in spaced relation to provide a duct between the two which provides communication between the sleeve and said openings.

6. An oil distributing unit comprising a sleeve, a tapered nozzle on one end of the sleeve, companion lips extending from the nozzle and sleeve and provided with registering openings, and means for maintaining the lips in slightly spaced relation to provide a duct between the two.

7. An oil distributing unit comprising a hollow body in which oil is adapted to be introduced, lips extending from the body and formed with registering openings, and means for maintaining the lips in spaced relation when inserted between the leaves of a spring in a manner to provide a channel between the lips through which oil can pass from the body to the openings.

8. A spring lubricating device comprising a single length of material bent to form a sleeve, the opposite ends of which are closed to provide a closed chamber adapted for the reception of oil, and companion lips extending from the sleeve and providing a duct which communicates with the chamber for the purpose described.

WILLIAM K. RILEY.